(12) United States Patent
Ferreras (10) Patent No.: US 8,757,938 B2
(45) Date of Patent: Jun. 24, 2014

(54) DRILL ALIGNMENT TOOL (76) Inventor: Julian Ferreras, Barrow, AK (US)

( * ) Notice: Subject to any disclaimer, the term of this patent is extended or adjusted under 35 U.S.C. 154(b) by 1105 days.

(21) Appl. No.: 12/761,125

(22) Filed: Apr. 15, 2010

(65) Prior Publication Data

US 2011/0255928 A1 Oct. 20, 2011

(51) Int. Cl.
B27G 17/08 (2006.01)

(52) U.S. Cl.
USPC .................. 408/114; 408/115 R; 408/103

(58) Field of Classification Search
USPC ......... 408/115 R, 103, 97, 87, 95, 115 B, 114
See application file for complete search history.

(56) References Cited

U.S. PATENT DOCUMENTS

| 2,351,243 | A | | 6/1944 | Vetter |
| 3,241,453 | A | | 3/1966 | Baldwin |
| 3,302,674 | A | | 2/1967 | Russell et al. |
| 3,338,277 | A | | 8/1967 | Tornoe et al. |
| 4,137,003 | A | * | 1/1979 | Budoff ......................... 408/103 |
| 4,257,166 | A | | 3/1981 | Barker et al. |
| 4,445,277 | A | * | 5/1984 | Keefe ............................. 33/197 |
| 4,715,125 | A | * | 12/1987 | Livick ............................ 33/197 |
| 4,842,453 | A | | 6/1989 | Raines et al. |

* cited by examiner

Primary Examiner — Christopher Besler
(74) Attorney, Agent, or Firm — Seed IP Law Group PLLC (57) ABSTRACT A tool for guiding a drill from both sides of a post having a top and at least one circumscribing side so that a single longitudinal axial bore is formed, the tool comprising: a first part adapted to clamp over the top of the post and position first and second guide plates on opposing sides of the post, the first and second guide plates having openings formed therein; and a second part adapted to position two opposing drill bushings in the openings in the first and second guide plates.

3 Claims, 6 Drawing Sheets

DRILL ALIGNMENT TOOL

BACKGROUND

1. Technical Field

The present disclosure pertains to boring holes through an object and, more particularly, to a tool for guiding a drill from opposing sides of an object to form either two elongate cavities in the object that are aligned along a central longitudinal axis or a single longitudinal bore completely through the object.

2. Description of the Related Art

The present disclosure is used in the context of attaching known caps to the tops of posts, such as pilings, fence posts, and the like. In order to attach a cap to the top of a post, at least one hole must be drilled entirely through the post or two longitudinally aligned holes from opposing sides of the post. A fastener then secures the cap to the piling or in the optional case, two fasteners, one on each side, are used. Ideally, a single fastener passing through the post is preferred.

Figure 1:
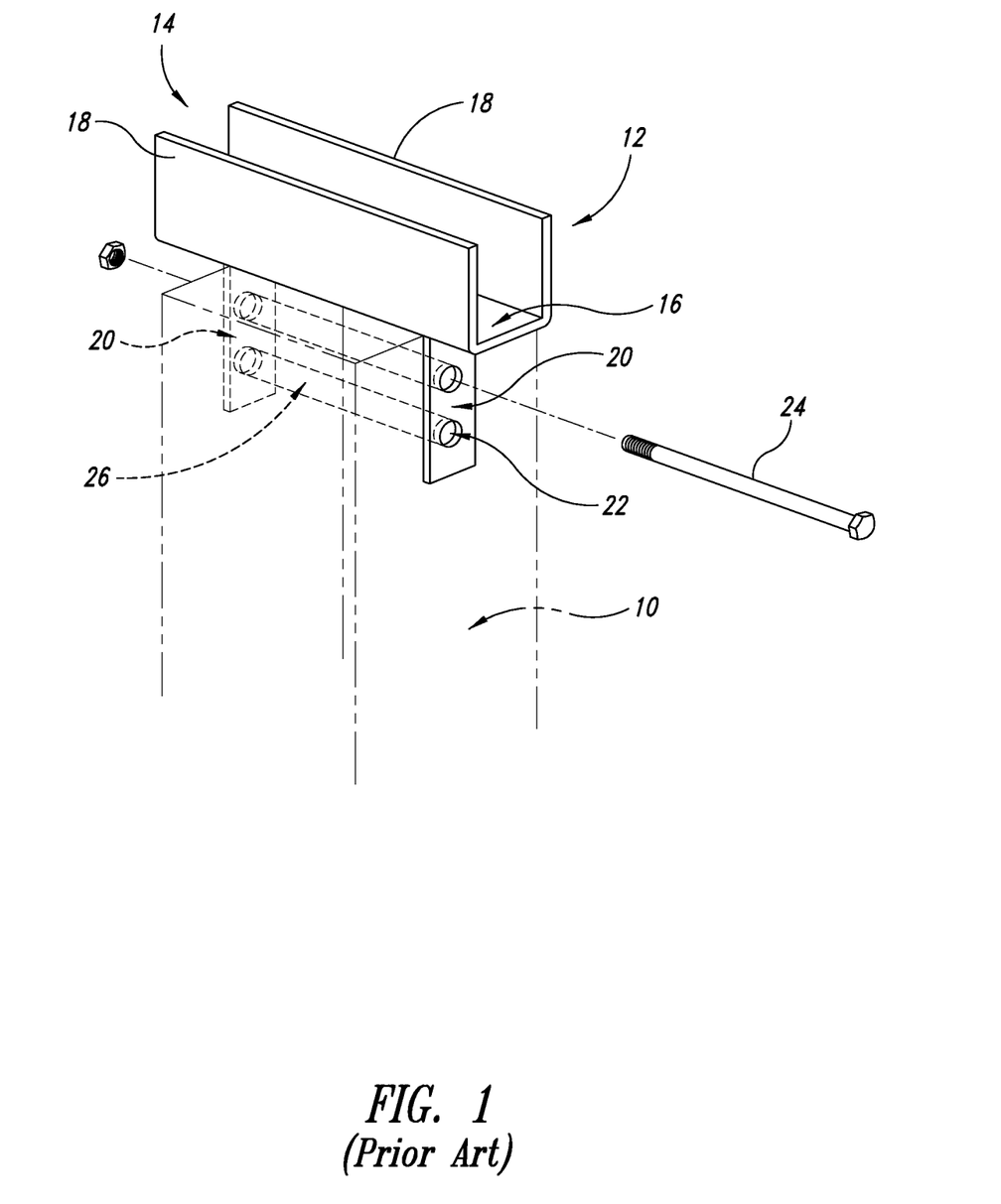
FIG. 1 is an isometric view of a cap installed on a post in accordance with the known art.

Referring initially to FIG. 1, shown therein is a post 10 having a cap 12 attached thereto. The cap 12 is of a conventional shape and includes a U-shaped channel 14 formed of a bottom wall 16 and two upright sidewalls 18. A pair of straps 20 depending from the bottom wall 16. The straps 20 have a plurality of openings 22 formed therein for one or more fasteners 24 to pass therethrough and through the post 10 to affix the cap 12 to the post 10.

In order for a fastener, in this case a bolt 24, to pass through the post 10, a hole 26 must be drilled entirely through the post. In this case, the hole 26 is sized and shaped to receive the fastener 24 and passes completely through the post 10 from opposing sides of the post 10.

In applications where the post or piling has a diameter or thickness greater than the length of a drill bit used to form the hole 26, the hole must be drilled alternatingly from both sides of the post. When drilling such a hole by hand, a worker must drill from both sides of the post 10 in the hope that the two holes will intersect inside the piling. Not only that, in order for the bolt 24 to slide unimpeded through the hole 26, the two holes formed from opposite sides of the post 10 must lie along the same longitudinal axis. Thus, there is a need for a tool that can guide a drill or drill bit into the post 10 from opposing sides so that the drill bit forms two holes or openings that intersect along the same longitudinal axis to form a single hole or bore 26 that is straight, of a uniform diameter, and is perpendicular to a plane of the side or sides of the post 10.

Various approaches have been used for guiding drills. For example, U.S. Pat. No. 2,351,243 describes a combination drill guide and clamp in which a U-shaped holder has first and second clamp members threadably engaged with the ends to clamp two pieces of work together side by side for drilling a hole therethrough. The clamp members 5 and 6 have internal diameters of different sizes to guide a drill therethrough. This particular device has a limited range of adjustment because the U-shaped holder is fixed in its configuration. In addition, exchanging the clamp members requires disassembly of a bushing 5' from the clamp member 5 and removal of both clamp members, which can be cumbersome and time-consuming.

U.S. Pat. No. 3,241,453 describes a multi-purpose jig that is designed to clamp to the side of a workpiece and guide a drill at a selected angle into the workpiece. This jig does not enable attachment to a post or piling for guiding a drill from both sides of the piling without removing the jig itself.

A boring jig for door locks is described in U.S. Pat. No. 3,338,277, which is designed for relatively thin doors in which a large opening is formed using a circular saw instead of a drill.

An adjustable drill template is illustrated in U.S. Pat. No. 4,257,166 having a flat rectangular plate with spaced drill guide holes therethrough that is attached to a single side of a workpiece for drilling hole positions, primarily for cabinet doors and drawers. This template would be unable to guide a drill through opposing sides of a piling and have the resulting openings formed along a single longitudinal axis without having to go through substantial measurements of the position of both plates on the post.

In U.S. Pat. No. 4,842,453, a guide apparatus for drilling oblique holes is provided to support a wood stock at an adjustable angle to a reference surface in a guide assembly for positioning a drill bit over the end of the wood stock and guiding the reciprocation of the drill bit to enable the drill bit to enter the surface of the wood stock adjacent the end obliquely and to pass out of the end to form a hole for receiving a screw. This apparatus is designed for workpieces that are smaller than the length of the drill bit. Hence, this apparatus would be ineffective with large pilings and posts.

A unit lock installation jig for doors is illustrated and described in U.S. Pat. No. 3,302,674. This jig fits over the end of the door to position two clamp members on opposing sides in alignment with each other to facilitate cutting operations for installations of latch and lock sets indoors. This design, similar to that of U.S. Pat. No. 3,338,277 described above, does not lend itself for use on large posts and pilings because of its limited range of adjustment. It is also designed for use with large circular saws instead of drill bits.

BRIEF SUMMARY

In accordance with the present disclosure, a tool for guiding a drill from both sides of a post having a top and at least one circumscribing side is provided so that a single longitudinal axial bore is formed through the post. In one embodiment, the tool includes a first part adapted to clamp over the top of the post and position first and second guide plates on opposing sides of the post, the first and second guide plates having openings formed therein; and a second part adapted to position two opposing drill bushings in the openings in the first and second guide plates.

In accordance with another aspect of the present disclosure, the first and second parts are adjustable to accommodate different post sizes.

In accordance with another aspect of the present disclosure, a plurality of pairs of bushings are provided, each pair of bushings having matching internal axial bores of a same diameter that is different from a diameter of the other pairs of bushings in order to accommodate different diameter drill bits.

In accordance with another aspect of the present disclosure, a device is provided, the device including a first U-shaped assembly having a crossmember with first and second ends, and first and second arms extending in the same direction from the first and second ends of the crossmember in spaced parallel relationship, at least one of the first and second arms adjustably mounted on the crossmember to move along the crossmember towards and away from the other of the first and second arms, each of the first and second arms comprising at least one opening that is at a same location along a length of the first and second arms; and a second U-shaped assembly having first and second legs extending from a connecting member in the same direction and in spaced parallel relationship to one another, at least one of the first and second legs adjustably mounted on the connecting member to move along the connecting member towards and away from the other of the first and second legs, one of the first and second legs having a coupling member extending therefrom that is sized and shaped to couple with a respective first sleeve on the first of the first U-shaped assembly, the second arm having a second sleeve formed thereon, the coupling member and the second sleeve receiving a respective bushing adapted to couple with the first U-shaped assembly.

In accordance with another aspect of the present disclosure, the coupling members have a longitudinal axial bore sized and shaped to receive a bushing, the bushing having a longitudinal axial bore. Ideally, the coupling members have an external cross-sectional shape that is sized to be received in the at least one opening in each respective arm.

In accordance with another aspect of the present disclosure, the device includes a clamp for each of the first and second arms and first and second legs that is adjustably mounted, the clamp adapted to clamp the respective at least one of the first and second arms and first and second legs to the respective crossmember or connecting member.

In accordance with another aspect of the present disclosure, the device includes a plurality of pairs of bushings sized and shaped to be individually received in the bore of the coupling members, each pair of the plurality of pairs of bushings having a matching diameter longitudinal axial bore that is a different diameter than a diameter of the other pairs of bushings in the plurality of pairs of bushings.

In accordance with another aspect of the present disclosure, a drill guide tool for guiding a drill into an object to be drilled is provided, the object having a top and at least one side surface, the drill formed to have a cylindrical overall shape with an outside diameter, the drill guide tool including a first assembly adapted to be mounted on the object, the first assembly comprising a first flat bar having mutually opposing planar sides and adapted to lie flat across the top of the object, and first and second guide plates depending from the flat bar in spaced parallel relationship to form a U shape in conjunction with the first flat bar, each guide plate having mutually opposing planar sides adapted to bear against the at least one side of the object, the first guide plate having a first end permanently formed with a first end of the first flat bar and the second guide plate having a first end adapted for selective positioning along a length of the first flat bar to accommodate objects of different diameters or different thicknesses, each guide plate having a plurality of openings formed therein of different sizes; and a second assembly adapted to be mounted to the first assembly and to guide a drill into the object through the guide plates of the first assembly, the second assembly comprising an elongate second flat bar and first and second legs depending from the flat bar in spaced parallel relationship to form a U shape in conjunction with the second flat bar, each guide plate having mutually opposing planar sides adapted to position a bushing into a respective opening in each of the guide plates to affix the second assembly to the first assembly.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with upright structural supports, including but not limited to posts and pilings, as well as tools such as drills and drill bits, and fasteners such as bolts and screws have not been shown or described in order to avoid unnecessarily obscuring descriptions of the embodiments.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 2:
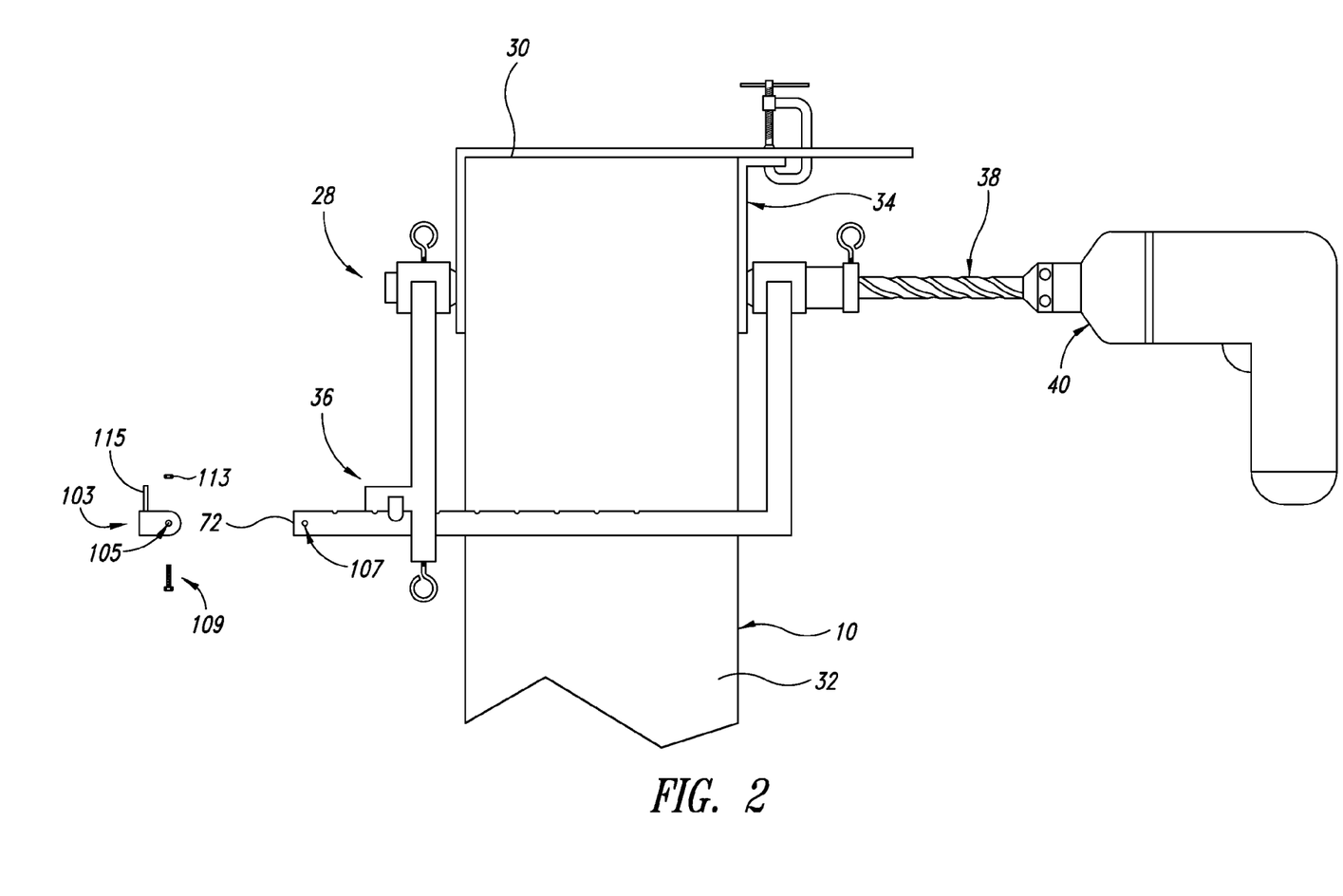
FIG. 2 is an isometric illustration of a tool formed in accordance with the present disclosure as mounted on a post.

Referring initially to FIG. 2, shown therein is a drill alignment tool 28 mounted to a post 10 having a top 30 and a circumscribing sidewall 32. In this example, the sidewall 32 is four sidewalls 32 orthogonal to each adjacent sidewall 32 forming a substantially square-shaped cross-sectional configuration for the post 10.

The drill alignment tool 28 has two parts, a first part 34 that attaches to the top 30 of the post 10 and a second part 36 that attaches to the first part 34. The tool 28 guides a drill 38, in this case driven by a hand-held drill motor 40, through the post 10 to exit from an opposing side of the post 10.

Figure 3:
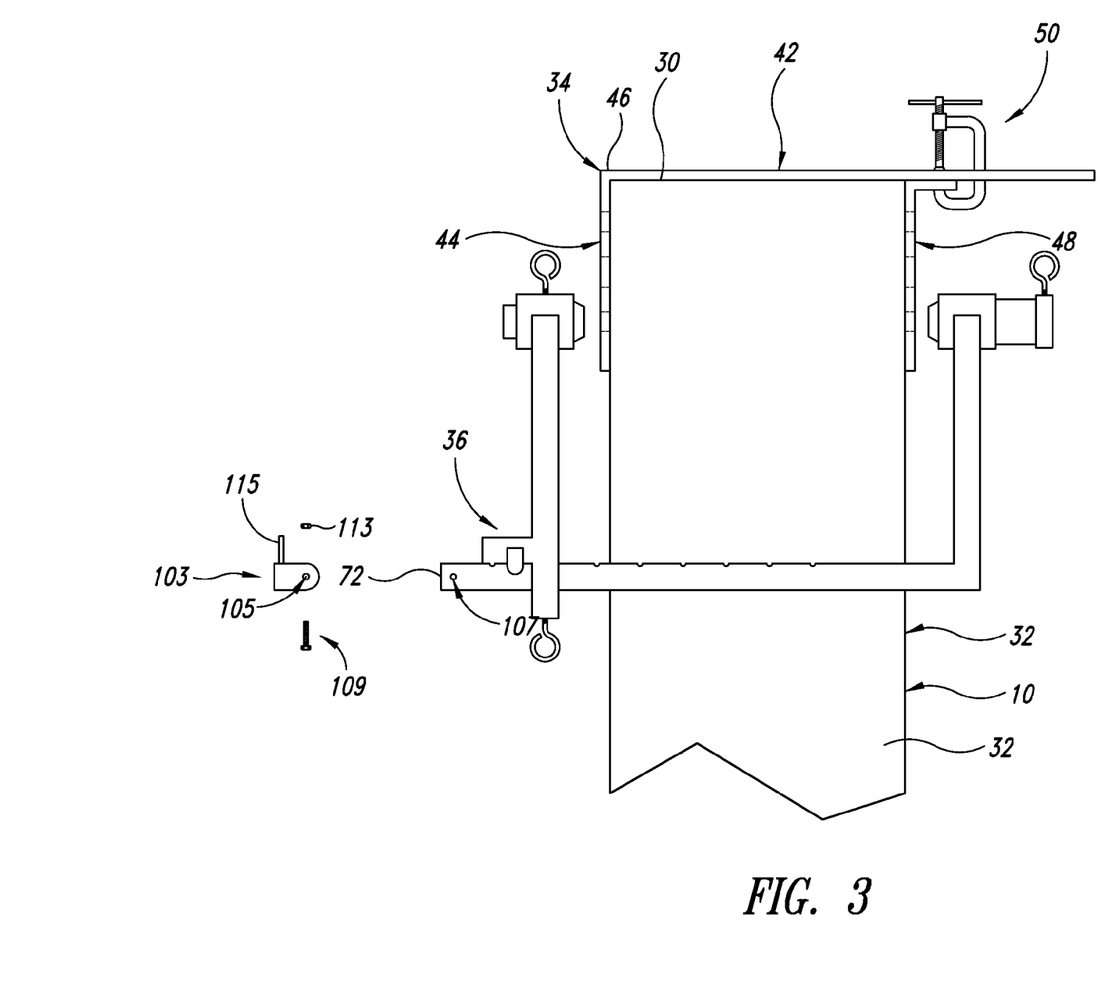
FIG. 3 is an exploded side view of the first and second parts uncoupled from each other.

Shown in FIG. 3 is a view of the first and second parts 34, 36 of the tool 28 uncoupled from each other. As can be seen in this view, the first part 34 is an assembly consisting of a crossmember 42 positioned on the top 30 of the post 10 and a first arm 44 depending from a first end 46 of the crossmember 42. A second arm 48 is clamped to the crossmember 42 with a clamp 50 to depend away from the crossmember 42 in the same direction as the first arm 44 to be in spaced parallel relationship with the first arm 44. The second arm 48 is adjustably mounted to the crossmember 42 in that it is formed as a separate component, and it is held in place by the clamp 50. This enables sizing of the first part 34 to accommodate posts of different widths or diameters.

Figure 4:
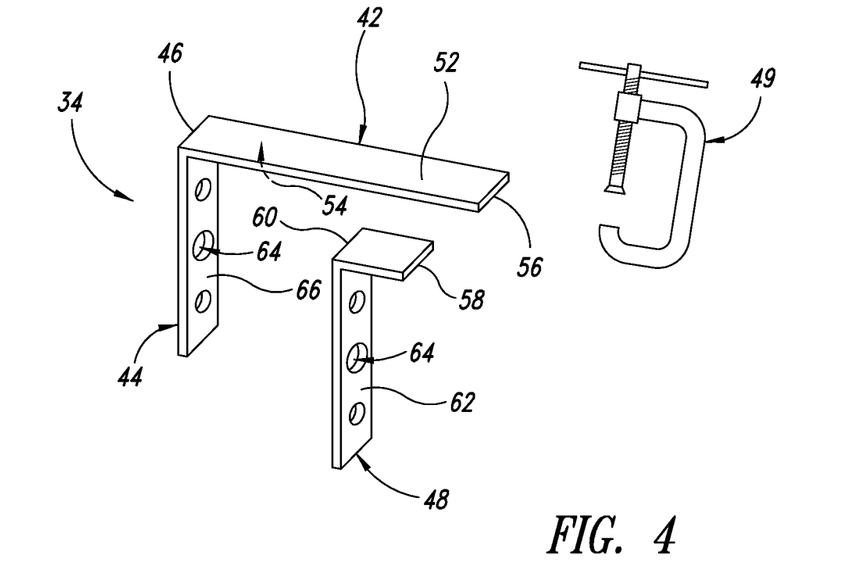
FIG. 4 is an exploded view of the components of the first part of the tool of the present disclosure.

As shown more clearly in FIG. 4, the crossmember 42 is preferably formed of a flat bar having mutually opposing planar sides 52, 54 that are adapted to lie flat across the top 30 of the post 10. The crossmember has a second end 56 opposite the first end 46 that defines a length of the crossmember 42 along which the second arm 48 can be positioned. The second arm 48 has an extension plate 58 extending from a first end 60 of the second arm 48 to be substantially orthogonal to a guide plate portion 62 of the second arm 48. The guide plate portion 62 has a plurality of openings 64 formed therein, which can be of different diameters. These openings 64 are shown to have a circular shape, although they can have other geometric shapes as desired.

Similarly, the first arm 44 has a planar guide plate portion 66 with a plurality of openings 64 formed therein. Ideally, the openings 64 in the first arm 44 have the same size and shape as the corresponding openings 64 in the second arm 48. In addition, the openings 64 are located at the same longitudinal or vertical position on both the first and second arms 44, 48. This ensures correct placement of the first part 36 with respect to the post 10 so that the drill bit 38 forms the bore 26 at substantially a right angle to the sides 32 of the post 10 and is substantially parallel to the plane of the top 30 of the post 10.

While the components of the first part are shown formed at substantially right angles or orthogonal to each other to accommodate the particular configuration of the post 10, it is to be understood that the components may be formed at other angles with respect to one another to fit onto objects of different configurations other than the rectangular post 10 shown in the figures.

When the second arm 48 is clamped to the crossmember 42 such as with a conventional C-clamp 49, the first and second arms 44, 48 cooperate with the crossmember 42 to have a U-shaped configuration that enables the first part 34 to be placed over and clamped tightly to the exterior of the post 10. Using the flat bar configuration for the first part 34 ensures a solid association between the first part 34 and the post 10 to prevent unintended movement of the first part 34 and to ensure that the second part 36 is at a substantially right angle in the orientation of the guiding members to the post 10.

Figure 5:
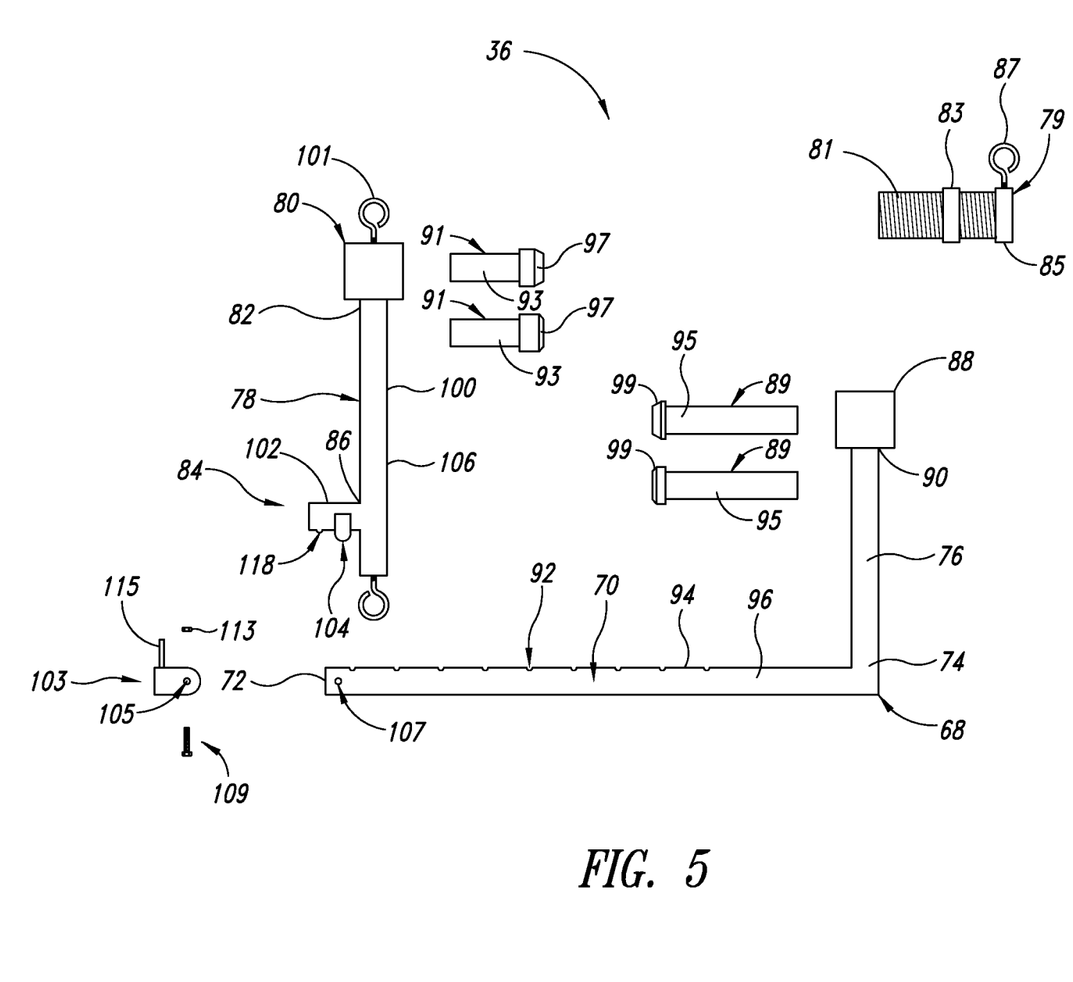
FIG. 5 is an exploded view of the components of the second part of the tool formed in accordance with the present disclosure.

Referring next to FIG. 5, shown therein is an exploded view of the components of the second part 36. These components include an L-shaped bracket 68 having an elongate connecting member 70 with first and second ends 72, 74 and a first leg 76 extending at substantially a right angle from the second end 74. Ideally the first leg 76 is integrally formed with the connecting member 70, although in this particular embodiment the first leg 76 is formed of metal as is the connecting member 70, and they are welded together at the second end 74. A second leg 78 is shown detached from the connecting member and formed to have a first sleeve 80 mounted at a first end 82 and a coupling assembly 84 formed at a second end 86. A second sleeve 88 is formed at a projecting end 90 of the first leg 76. In accordance with one aspect of the present design, the connecting member 70 is formed of flat bar material having planar first and second opposing sides 96, 98, which is shown more clearly in FIG. 6.

The second leg 78 is adapted to be positioned at selected locations along a length of the connecting member 70 so that it can move towards and away from the first leg 76. A plurality of notches 92 are formed in a first edge 94 of the connecting member 70 that cooperate with the coupling mechanism 84 on the second leg 78.

Also shown in FIG. 5 is a coupling member 79 having a cylindrical or tubular shape with an internal axial bore. External threads 81 are formed on the exterior of the coupling member 79 to receive a threaded jam nut 83 that moves along a length of the coupling member 79. A collar 85 is formed at one end of the coupling member 79. Ideally, it is integrally formed as a part of the coupling member 79. However, the collar 85 may also be threadably received onto the external threads 81 and welded or bolted into place. A set screw 87, shown in the form of an eyebolt, is threadably received in an opening in the collar to extend through a sidewall of the coupling member 79 and into the longitudinal axial bore.

A plurality of bushings 89, 91 are shown positioned adjacent their respective sleeves 80, 88. The bushings are formed in pairs (89, 91) to have matching diameter internal axial bores to which the drill passes. Each of the bushings 89, 91 has a shaft portion 93, 95 with a head 97, 99 formed at one end, respectively. The shafts 93 on the bushings 91 are sized and shaped to be received inside the longitudinal axial bore of the first sleeve 80 formed at the end 82 of the second leg 78. The shaft 95 of the other bushings 89 have an external diameter that are sized and shaped to be received inside the internal axial bore of the coupling member 79.

The bushings 91 are held in place in the first sleeve 80 by a set screw 101 that is threadably received within the sleeve 80 to extend inside the longitudinal axial bore thereof. The set screw 87 and the coupling member 79 bear against the shafts 95 of the other bushings 89 to retain them in position inside the coupling member 79. The heads 97, 99 of the bushings 89, 91 are sized and shaped to be partially received within the openings 64 of the first part 34 to thus align and couple the second part 36 to the first part 34, as shown in FIG. 2.

As shown in this embodiment, the heads 97, 99 of the bushings 89, 91 are thus sized to have a larger diameter than their respective shafts 93, 95. Also, the shafts 95 of the bushings 89 have a longer length than the shafts 93 of the bushings 91 in order to be received fully within the coupling member 79.

The coupling member 79 is threadably received inside the longitudinal axial bore of the second sleeve 88, which has internal threads to receive the external threads 81 of the coupling member 79. The jam nut 83 retains the coupling member 79 at its location in the sleeve 88 to thus accommodate varying diameters of the post 10 and permit selective tightness in the coupling.

Also shown in FIG. 5 is a stop member 103 in the form of a U-shaped sleeve that slides over the end 72 of the connecting member 70 of the L-shaped bracket 68. An opening 105 is formed in the stop member 103 that corresponds to an opening 107 formed at the second end 72 of the bracket 68 to receive a fastener 109 with corresponding nut 113. A post 115 extends from one side of the U-shaped stop member 103 that stops the second leg 78 in its travel along the connecting member 70 by bearing against the foot 102.

Figure 6:
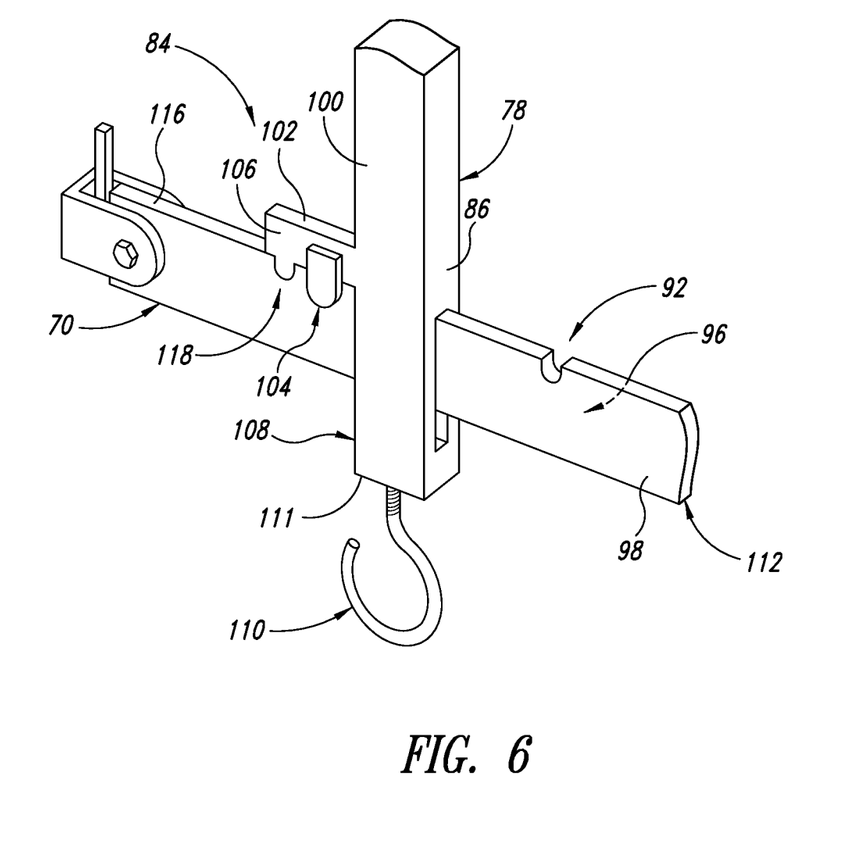
FIG. 6 is an enlarged isometric view of the second leg 78 attached to the connecting member 70 via the coupling mechanism 84.

FIG. 6 is an enlarged isometric view of the second leg 78 attached to the connecting member 70 via the coupling mechanism 84. As shown therein, the second leg 78 has an L-shaped configuration formed from a first segment 100 having a foot 102 extending therefrom and coplanar therewith. An extension leg 104 is attached to or formed integrally with one side 106 of the foot 102 to extend below a bottom edge of the foot 102 and bear against the side 98 of the connecting member 70. The first segment 100 is sized to extend below the connecting member 70 on both sides thereof to form a channel 108 through which the connecting member 70 is received. A threaded eyebolt or thumb screw 110 is received in a bottom wall 111 of the first segment 100 and into the channel 108 to project upward and bear against a bottom edge 112 of the connecting member. Thus, the eyebolt 110 urges the first leg 100 and foot 102 to bear against a top edge 116 of the connecting member 70 while the eyebolt 110 bears against the bottom edge 112, thus clamping the second leg 78 to the connecting member 70. A stabilizing lip 118 extends downward from the foot 102 that is sized and shaped to be received in one of the notches 92 in the connecting member 70 to stabilize the second leg 78 in position on the connecting member 70. In addition, the extension leg 104 helps maintain the second leg 78 in engagement with the connecting member 70 when the eyebolt 110 is backed out to allow the second leg 78 to slide along the length of the connecting member 70 towards and away from the first leg 76.

Figure 7:
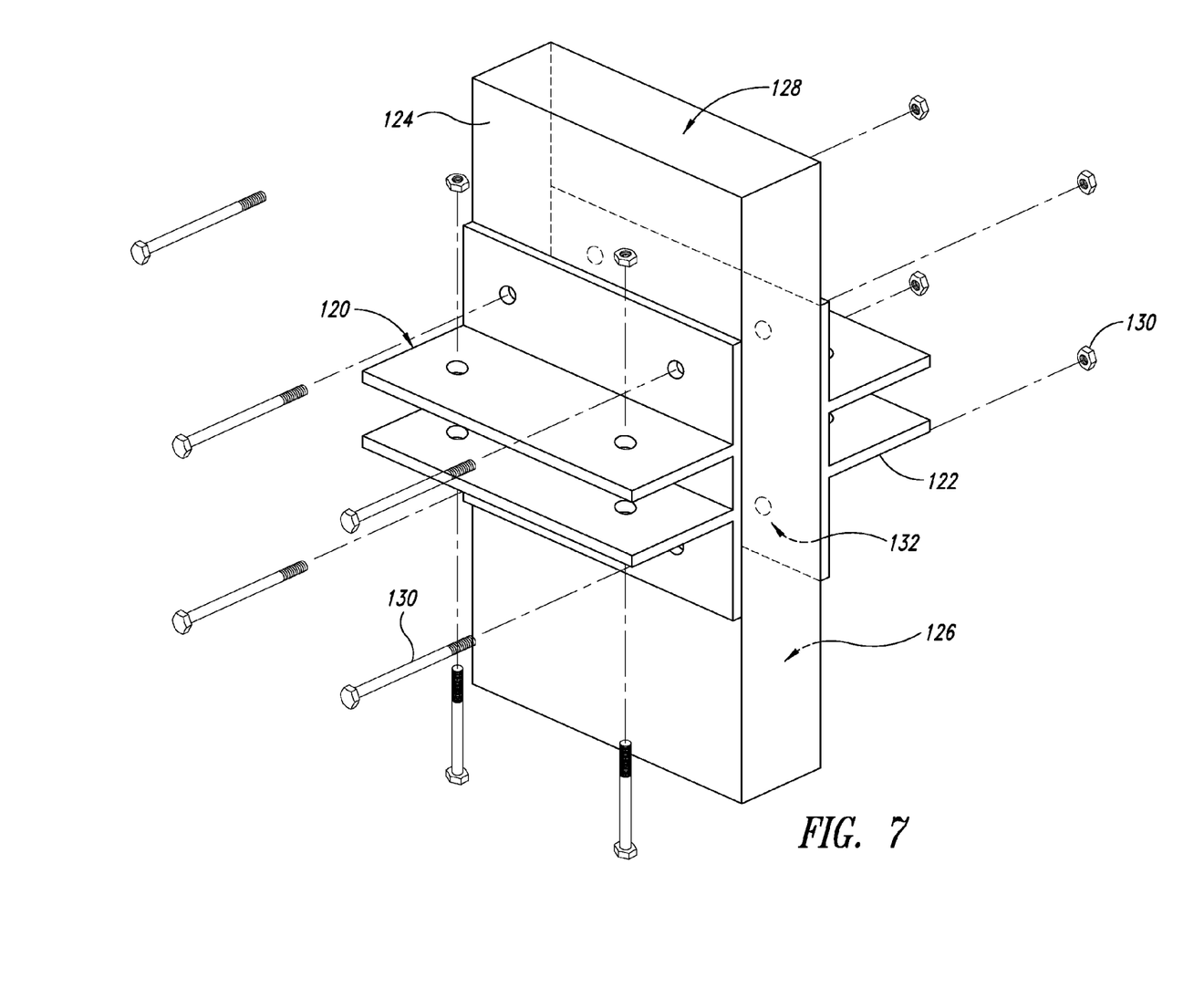
FIG. 7 is an isometric view of an installation of a cap on a post using the tool of the present disclosure.

FIG. 7 is an isometric illustration of another application of the present disclosure in which a pair of connectors 120, 122 are attached to opposing sides 124, 126, respectively, of a beam 128 with fasteners 130 positioned through elongate openings 132 formed in the beam 128 by the tool of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A tool for guiding a drill from a first side and an opposing second side of a post having a top so that a single longitudinal axial bore is formed, the tool comprising:
   first and second bushings that each have an internal axial bore sized to slidably receive the drill;
   a first part adapted to clamp over the top of the post and position first and second guide plates on the opposing first and second sides of the post, the first and second guide plates having openings formed therein; and
   a second part adapted to position the first and second bushings in the openings in the first and second guide plates on the first and second opposing sides of the post, the second part including first and second opposing sleeves, the first sleeve configured to slidably receive the first bushing, the second sleeve having an internal axial bore with internal threads; and
   a coupling member having external threads capable of being threadably received in the internal axial bore of the second sleeve and an internal axial bore configured to slidably receive the second bushing.

2. The tool of claim 1 wherein the first and second parts are adjustable to accommodate different post sizes.

3. The tool of claim 1, comprising a plurality of the first and second bushings, each of the first and second bushings having matching internal axial bores of a same diameter that is different from a diameter of the other first and second bushings to accommodate different diameter drill bits.

* * * * *